United States Patent
Blankenship

[11] 3,932,162
[45] Jan. 13, 1976

[54] METHOD OF MAKING GLASS OPTICAL WAVEGUIDE

[75] Inventor: Michael G. Blankenship, Corning, N.Y.

[73] Assignee: Corning Glass Works, Corning, N.Y.

[22] Filed: June 21, 1974

[21] Appl. No.: 481,529

[52] U.S. Cl. .............................. 65/3; 65/4; 65/13; 65/DIG. 7; 427/167
[51] Int. Cl.² ................. C03C 25/02; C03B 37/02
[58] Field of Search ............ 65/3, 4, 18, 31, DIG. 7, 65/13; 264/1; 427/167, 223

[56] References Cited
UNITED STATES PATENTS

| | | | |
|---|---|---|---|
| 3,294,504 | 12/1966 | Hicks | 65/4 X |
| 3,455,667 | 7/1969 | Snitzer et al. | 65/4 |
| 3,711,262 | 1/1973 | Keck et al. | 65/4 X |
| 3,737,293 | 6/1973 | Maurer | 65/4 X |
| 3,823,995 | 7/1974 | Carpenter | 65/18 X |

Primary Examiner—Robert L. Lindsay, Jr.
Attorney, Agent, or Firm—William J. Simmons, Jr.; Walter S. Zebrowski; Clarence R. Patty, Jr.

[57] ABSTRACT

A method of forming an optical waveguide by forming a first layer of glass having a predetermined refractive index on the outside peripheral wall surface of a substantially cylindrical mandrel. Thereafter, a second layer of glass is applied to the surface of the first layer, the second layer having a refractive index less than that of the first layer. The mandrel is removed from the assembly and the resultant cylindrical, hollow assembly is heated and drawn to reduce the cross-sectional area thereof, thereby forming an intermediate fiber. At least a portion of the intermediate fiber is disposed within a hollow glass cylinder having a refractive index similar to that of the second layer of glass of the intermediate fiber. The resultant composite structure is heated and drawn to reduce the cross-sectional area thereof and to collapse the inner, first layer of glass and to cause the inner surface of the glass tube to collapse upon the outer surface of the intermediate fiber to form a fiber having a solid cross-sectional area.

15 Claims, 7 Drawing Figures

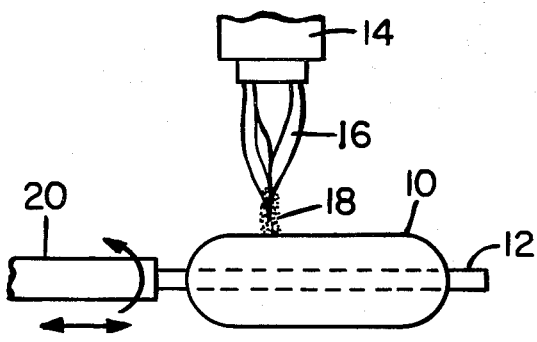
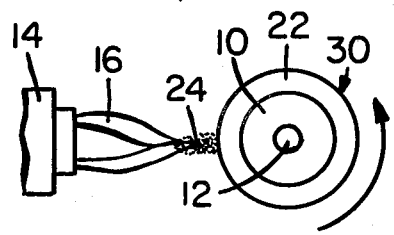
Fig. 1
Fig. 2
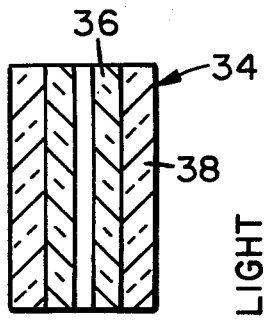
Fig. 3
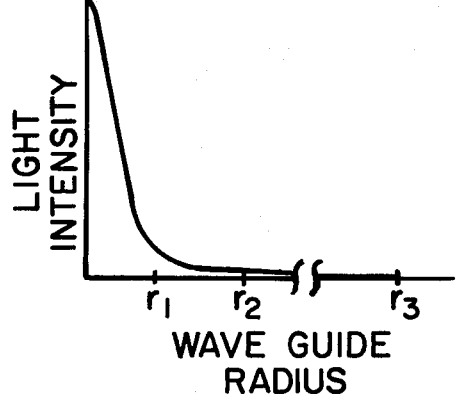
Fig. 4
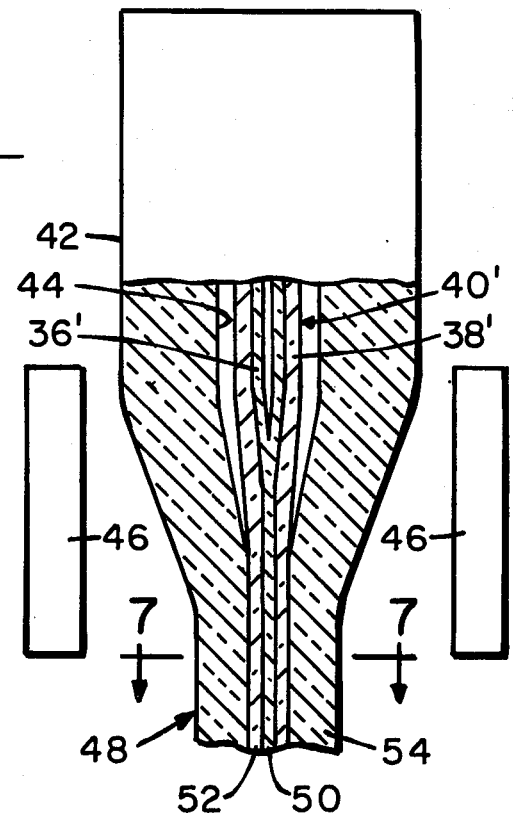
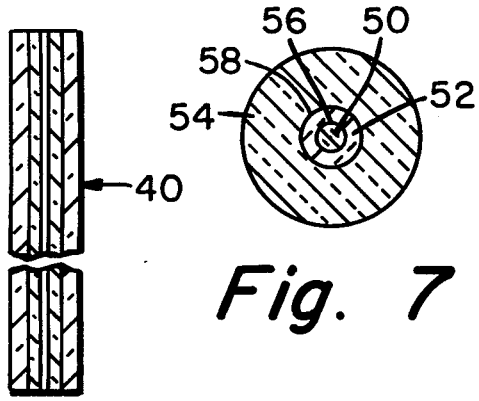
Fig. 7
Fig. 5
Fig. 6

METHOD OF MAKING GLASS OPTICAL WAVEGUIDE

BACKGROUND OF THE INVENTION

This invention relates to a method of making high quality glass optical waveguides having small diameter cores, and more particularly, to a method of making optical waveguides of the type that are adapted to propagate only one or a few modes.

High capacity communication systems operating around $10^{15}$ Hz are needed to accommodate future increases in communication traffic. These systems are referred to as optical communication systems since $10^{15}$ Hz is within the frequency spectrum of light. Optical waveguides, which are the most promising medium for transmission at such frequencies, normally consist of an optical fiber having a transparent core surrounded by transparent cladding material having a refractive index which is lower than that of the core. A very thorough and complete discussion concerning the operational theories of optical waveguides is contained in U.S. Pat. No. 3,157,726 issued to Hicks et al., and in the publication "Cylindrical Dielectric Waveguide Modes" by E. Snitzer, Journal of the Optical Society of America, Vol. 51, No. 5, pages 491–498, May, 1961. Another excellent source of information concerning optical waveguides is "Fiber Optics — Principles and Applications" by N. S. Kapany, Academic Press, 1967.

The propagation of light waves is governed by laws of physics similar to those that govern microwave propagation and therefore can be studied in terms of modes. Each of these modes has its own propagation and distribution characteristics. The conditions under which propagation of a particular mode will no longer be localized within and around the core of an optical fiber can be expressed in terms of a cutoff value or parameter U. An exceptionally complex equation, and an explanation thereof, from which the value U for a particular mode can be determined may be found on page 55 of the aforementioned book by N. S. Kapany. Kapany also expresses a fiber characteristic term R, now commonly referred to as V, in terms of the optical fiber variables by the equation $$V = (2\pi a/\lambda) \sqrt{n_1^2 - n_2^2} \qquad (1)$$

where $a$ is the core radius of the waveguide, $\lambda$ is the wavelength of light to be transmitted and $n_1$ and $n_2$ are the refractive indices of the core and cladding, respectively. Equation (1) can be rewritten as $$V = (2\pi a/\lambda) \sqrt{(n_1 + n_2)(n_1 - n_2)} \qquad (2)$$

Then, as explained in Kapany, for a particular mode to propagate within an optical fiber having a particular fiber characteristic term $V$, $V$ must be greater than or equal to the cutoff value U for said mode.

Typical multimode waveguides have core diameters between 50 micrometers and 100 micrometers and corecladding refractive index differences of several percent. Thousands of modes propagate, each mode traveling at a slightly different group velocity. A short input pulse that is shared by many guided modes thus splits up into a sequence of pulses that arrive at the output end at different times. This pulse dispersion limits the information carrying capacity of multimode waveguides. The total number of modes that can be supported by a waveguide fiber is given approximately by the equation $$N = \tfrac{1}{2} V^2 \qquad (3)$$

Equations (3) and (2) indicate that more modes can be guided if the core radius is large of if the refractive index difference is large. It is noted that equation (3) is not very accurate for small values of N, but it is useful for approximating the number of modes that will be propagated by a multimode optical waveguide.

It is possible to design an optical waveguide so that only one mode, the $HE_{11}$ mode, is propagated, thereby eliminating the aforementioned mode delay distortion and opening the way to gigabit transmission. It has been determined that for such single mode operation, V must be less than 2.405. If V is set equal to 2.405, and equation (2) is evaluated, it can be seen that a method of limiting light propagation of a desired wavelength to one mode is to coordinate the waveguide parameters $a$, $n_1$, and $n_2$. That is, if the difference between the two indices of refraction $(n_1 - n_2)$ increases, the core radius must decrease, and if $(n_1 - n_2)$ decreases, the core radius must increase. Producing waveguides having core and cladding indices of refraction within limits necessary to maintain single mode propagation is difficult even for waveguides with very small cores. The difficulty is markedly increased in producing waveguides with larger cores, since the difference in refractive indices must be correspondingly decreased. As an example, if the optical waveguide is to have a small core, that is, a core diameter of approximately one micron, the required difference in the two indices of refraction will be of the order of $10^{-2}$, and if the optical waveguide is to have a large core, that is, a core diameter of approximately one millimeter, the required difference in the two indices of refraction would be even smaller, that is, on the order of $10^{-4}$.

Even though single mode waveguides exhibit extremely low pulse dispersion, the use thereof for long distance transmission of light is not feasible unless they are capable of providing low loss light transmission. Absorption losses can be minimized by employing high purity glasses having an extremely low content of impurity ions. Although some intrinsic scattering due to inhomogeneities of the dielectric material is unavoidable, scattering losses also result from corecladding interface irregularities caused by the trapping of numerous tiny air bubbles and foreign particles at that interface and by core diameter variations due to inadequate dimensional control. The present invention relates to a method of forming an optical waveguide in which these latter mentioned scattering losses are minimized.

DESCRIPTION OF THE PRIOR ART

A present method of producing a conventional optical fiber is disclosed in U.S. Pat. No. 3,227,032 issued to L. O. Upton. This method comprises inserting a rod of glass possessing the desired core characteristics into a tube of glass possessing the desired cladding characteristics. The temperature of this combination is then raised until the viscosity of the materials is low enough for drawing. The combination is then drawn until the tube collapses around and fuses to the inside rod. This resulting combination rod is then further drawn until its cross-sectional area is decreased to the desired dimensions. This method is normally used to produce glass optical fibers having a large core and a thin outside cladding. As an example, the total diameter to core diameter ratio of such a fiber might be 8:7.

The stringent optical requirements placed on the transmission medium to be employed in optical communication systems has negated the use of conventional glass fiber optics, since attenuation therein due to both scattering and impurity absorption is much too high. Since pure fused silica has the lowest known optical attenuation of any glass in the red and near infrared portion of the spectrum where optical communications appears most promising, pure fused silica and doped fused silica were among the earliest considered materials for use in the fabrication of optical waveguides. For example, single mode optical waveguides have been formed by inserting a titania doped silica fiber into a silica capillary. The tubing is heated and collapsed onto the central fiber, and the resulting cane is redrawn to waveguide dimensions. Waveguides produced by this method are unsatisfactory since the occurrence of numerous tiny air bubbles and foreign particles at the core-cladding interface and variations in core diameter cause very high attenuation.

U.S. Pat. No. 3,711,262 issued to D. B. Keck et al. discloses a method of forming a single mode waveguide having an unusually clean and strong bond between the core and cladding materials. Waveguides made in accordance with the method of that patent exhibit lower attenuation resulting from light scattering centers at the core-cladding interface. The method of that patent comprises the steps of forming by the flame hydrolysis process a coating of glass soot on the inside wall of a glass tube, heating the resultant structure to consolidate the glass soot and form a dense glass layer free from particle boundaries, and thereafter drawing the glass tube and glass layer combination to reduce the cross-sectional area thereof and to collapse the layer of glass to form a fiber having a solid cross-sectional area. Although an improved core-cladding interface can be formed, it is difficult to form by this method single mode waveguides in which the core diameter is controlled to the desired tolerance because of the difficulty encountered in forming such a thin glass layer of uniform thickness on the inner surface of the glass tube.

Multimode fibers having a relatively low total diameter to core diameter ratio have been made by the method set forth in U.S. Pat. No. 3,737,292 issued to D. B. Keck et al. In accordance with the method of that patent a multimode optical waveguide is formed by applying by the flame hydrolysis process a first layer of glass having a predetermined refractive index on the outside peripheral wall surface of a substantially cylindrical mandrel and thereafter applying by the flame hydrolysis process a second layer of glass to the outside surface of the first coating, the refractive index of the second layer being less than that of the first layer. The mandrel is removed by acid etching, drilling or the like. The resulting cylindrical hollow assembly is heated and drawn to reduce the cross-sectional area thereof and to collapse the first and inner layer of glass to form a solid fiber having a high quality core-cladding interface. To employ this method to form single mode optical waveguides having large total diameter to core diameter ratios, the thickness of the first applied glass layer must be drastically decreased and that of the second applied glass layer must be correspondingly increased, and it is therefore extremely difficult to control the diameter of the resultant waveguide core to the required tolerance.

SUMMARY OF THE INVENTION

It is therefore an object of the present invention to provide a method of forming optical waveguides having relatively high ratios of total diameter to core diameter, wherein the core diameter can be controlled to tight tolerances. Another object is to provide a method of forming low loss single mode optical waveguides.

Briefly, according to this invention an optical waveguide is produced by applying a first layer of glass to the outside peripheral surface of a cylindrical mandrel. Thereafter, a second layer of glass having a refractive index less than that of the first layer is applied over the peripheral outside surface of the first layer. The mandrel is removed from the assembly following the application of either the first or second layer of glass. The resultant substantially cylindrical hollow assembly is then heated to a temperature at which the materials thereof have a low enough viscosity for drawing, and it is drawn to reduce the diameter thereof, thereby forming an intermediate fiber. At least a portion of the intermediate fiber is disposed within a glass tube having a hole extending axially therethrough. This final composite structure is heated to the drawing temperature thereof and is drawn to reduce the cross-sectional area thereof and to collapse any air spaces existing therein, thereby forming an optical waveguide fiber having a solid cross-section.

BRIEF DESCRIPTION OF THE DRAWINGS

FIGS. 1 and 2 illustrate the application of first and second coatings of glass soot to a mandrel.

FIG. 3 is a cross-sectional view of a first dense glass composite structure formed in accordance with the method of the present invention.

FIG. 4 is a graph illustrating the light intensity distribution as a function of the radial distance from the center of an optical waveguide.

FIG. 5 is a cross-sectional view of an intermediate fiber obtained by drawing the composite structure of FIG. 3.

FIG. 6 is a fragmentary elevation, partially in cross-section, illustrating an optical waveguide being formed in accordance with the present invention.

FIG. 7 is a cross-section taken along lines 7—7 of FIG. 6.

DESCRIPTION OF THE PREFERRED EMBODIMENTS

It is to be noted that the drawings are illustrative and symbolic of the present invention, and there is no intention to indicate the scale or relative proportions of the elements shown therein.

One method of forming a single mode optical waveguide fiber is illustrated in the drawings. Referring to FIG. 1, a coating 10 of glass soot is applied to cylindrical mandrel 12 by means of flame hydrolysis burner 14. Fuel gas and oxygen or air are supplied to burner 14 from a source (not shown). This mixture is burned to produce flame 16 which is emitted from the burner. A gas-vapor mixture is hydrolyzed within flame 16 to form a glass soot that leaves the flame in a stream 18, which is directed toward mandrel 12. The flame hydrolysis method of forming soot coatings on cylindrical mandrels is described in greater detail in the aforementioned U.S. Pat. No. 3,737,292. Mandrel 12 is supported by means of support portion 20 and is rotated and translated as indicated by arrows adjacent thereto in FIG. 1 for uniform deposition of soot. Uniform soot deposition can also be obtained by causing the flame to traverse the length of the rotating mandrel. This first soot coating should be sufficiently thick that the diameter thereof can be measured with reasonable precision. It is presently thought that the minimum thickness of coating 10 is about 5 mm, which will result in a glass layer about 1.7 mm thick after the soot is consolidated.

A second coating of soot is applied over the outside peripheral surface of first coating 10 as shown in FIG. 2. In accordance with well-known practice the refractive index of coating 22 is made lower than that of coating 10 by changing the composition of the soot 24 being produced in flame 16. This can be accomplished by changing the concentration or type of dopant material being introduced into the flame, or by omitting the dopant material. Mandrel 12 is again rotated and translated to provide a uniform deposition of coating 22, the composite structure including first coating 10 and second coating 22 constituting an optical waveguide soot preform 30. The outside diameter of preform 30 is made as large as possible so that the diameter of the intermediate cladding layer of the resultant waveguide fiber is relatively large. If the diameter of the soot preform is too large, it will be likely to encounter mechanical breakage due to thermal shock to which it is subjected upon cooling after soot deposition or after consolidation. Also, the quality of the consolidated glass tends to become poorer due to increased seed count as the preform diameter increases. Soot preforms having diameters as large as about 60 mm have been found to be satisfactory.

In the manufacture of optical waveguides, the materials of the core and cladding of the waveguide should be produced from a glass having minimum light attenuation characteristics, and although any optical quality glass may be used, fused silica is a particularly suitable glass. For structural and other practical considerations, it is desirable for the core and cladding glasses to have similar physical characteristics. Since the core glass must have a higher index of refraction than the cladding for proper operation, the core glass may desirably be formed of the same type of glass used for the cladding and doped with a small amount of some other material to slightly increase the refractive index thereof. For example, if pure fused silica is used as the cladding glass, the core glass can consist of fused silica doped with a material to increase its refractive index.

There are many suitable materials that can satisfactorily be used as a dopant alone or in combination with each other. These include, but are not limited to, titanium oxide, tantalum oxide, tin oxide, niobium oxide, zirconium oxide, aluminum oxide, lanthanum oxide and germanium oxide. Optical waveguides can also be made by forming the core from one or more of the aforementioned dopant oxides, the cladding being made from one or more materials having a lower refractive index. For example, a core made of pure germanium oxide may be surrounded by a cladding layer of silica doped germanium oxide. A core of germania doped fused silica is advantageously provided with a cladding layer of fused silica doped with boron oxide which provides a refractive index slightly lower than that of pure fused silica and also gives the cladding layer a somewhat higher thermal coefficient of expansion than pure fused silica, thereby providing a better match between the coefficients of expansion of the core and cladding materials.

After a soot preform of the desired dimensions has been formed on the mandrel, the mandrel-preform composite is inserted into a furnace wherein the soot is subjected to a temperature within the consolidation temperature range thereof. The particles of soot fuse and consolidate to form a dense glass body free from particle boundaries. The consolidation temperature depends upon the composition of the glass soot. For example, the consolidation temperature is in the range of about 1250°C to 1700°C for high silica content soot, consolidation at 1250°C requiring a very long time. The preferred consolidation temperature for high silica content soot is between 1400°C and 1500°C. The consolidation temperature for soot of other compositions is lower than that for silica, high germania content soot being easily consolidated at about 900°C. Moreover, if the surface upon which the glass is being deposited is maintained at a sufficiently high temperature, a layer of consolidated dense glass can be directly deposited on the mandrel by flame hydrolysis. This can be accomplished by the use of auxiliary heating means and/or increasing the temperature of the flame in which the vapor is hydrolyzed. Glass consisting of germania and up to 25% silica has been deposited in this manner directly upon a mandrel.

The first and second soot coatings need not be simultaneously consolidated as described hereinabove. Coating 10 may be consolidated and its exterior surface suitably finished before coating 22 is applied. In such an embodiment coating 22 would thereafter be consolidated before subsequent drawing. In addition, mandrel 12 may be removed from the assembly before the second soot coating is applied, or it may be removed after both the first and second soot coatings are applied and consolidated.

The first and second glass layers may be applied by a variety of methods including but not limited to radio frequency sputtering, consolidating a layer of soot deposited by the flame hydrolysis process, chemical vapor deposition, depositing a glass frit, and the like. Clearly, the first and second glass layers may be applied by either the same or different methods.

The mandrel may be removed by etching, reaming, core drilling or the like. Since the mandrel is ultimately removed, the material thereof need only be such as to have a composition and coefficient of expansion compatible with the waveguide cladding and core materials. Suitable materials are glass, ceramic, graphite and the like. It is preferred to employ as the mandrel a hollow tube which can be removed by pumping acid therethrough. After the mandrel is removed, the hollow, cylindrical, dense glass composite structure 34 of FIG. 3 remains. Composite structure 34 comprises first and second dense glass layers 36 and 38, respectively, the refractive index of layer 36 being greater than that of layer 38.

Composite structure 34 is an intermediate product that is obtained by the method set forth in the aforementioned U.S. Pat. No. 3,737,292. The final product produced by the method of that patent is obtained by heating structure 34 to the drawing temperature of the materials thereof and drawing the heated structure to reduce the cross-sectional area thereof and to collapse the hole therein, thereby forming a multimode optical waveguide fiber having a solid cross-section. Typical final multimode waveguide dimensions may be a core diameter of 120 $\mu$m and a cladding thickness of about 40 $\mu$m. To continue drawing such a fiber until the core diameter thereof is small enough for single mode propagation, i.e., a core diameter of a few micrometers, would result in an extremely weak fiber due to the small outside diameter thereof. The light intensity distribution of an optical signal propagating in such a waveguide is illustrated in FIG. 4 wherein $r_1$ and $r_2$ are the core and cladding radii, respectively. Since the light intensity is greater than zero at the cladding radius $r_2$, a single mode waveguide of such small cladding thickness will be adversely affected by radiation loss, phase shift problems and cross talk between adjacent fibers.

An apparent solution to this problem is to increase the thickness of second glass layer 38 while maintaining the thickness of the first applied layer 36 constant. However, as mentioned hereinabove, this would increase the possibility of mechanical failure and decrease the quality of the glass. If the overall diameter of composite structure 34 is maintained constant and the thickness of the first glass layer 36 is decreased, local thickness variations will become a greater percentage of the total thickness of layer 36. The core diameter of a waveguide formed from such a preform cannot be controlled to the necessary tolerance.

In accordance with the present invention composite structure 34 is heated to the drawing temperature of the materials thereof and drawn to reduce the cross-sectional area thereof, thereby forming intermediate fiber structure 40 of FIG. 5. This preliminary drawing step need not collapse the first applied layer 36. Drawing is continued until the outside diameter of structure 40 is small enough to permit its insertion into the center of a thick wall tube 42 as illustrated in FIG. 6 wherein elements similar to those of FIGS. 3 and 5 are represented by primed reference numerals. A piece of fiber structure 40 about equal in length to tube 42 is inserted into tube 42, there preferably being a snug but clearance fit therebetween. The two-part structure including intermediate fiber structure 40' and tube 42 are heated by furnace 46 until the materials have a viscosity low enough for drawing. The structure is then drawn to reduce the cross-sectional area thereof, to collapse layer 36' and to collapse the inner surface 44 of tube 42 into fused relation with the outer surface of structure 40', thereby forming a fiber having a solid cross-section. Thereafter, continued drawing of this composite structure further reduces the diameter thereof to form a glass optical waveguide fiber which possesses the desired characteristics. Waveguide fiber 48, which is additionally illustrated in FIG. 7, comprises a core 50 having a radius $r_1$ surrounded by a layer 52 of cladding material having a radius $r_2$ which in turn is surrounded by an outer cladding layer 54 having a radius $r_3$ (see FIG. 4). An interface 56 exists between core 50 cladding layer 52, and an interface 58 exists between cladding layers 52 and 54. The quality of interface 56 is higher than that of interface 58 because of the methods by which these two interfaces are formed. The required quality of interface 56 decreases as the diameter of layer 52 increases. Generally, the fraction of the optical signal that propagates in layer 54 becomes negligible when the diameter of layer 52 exceeds about 10 $\mu$m. It is noted, however, that the highest quality optical waveguide is formed by ensuring that interfaces 56 and 58 are both of the highest possible quality.

Since, as explained in conjunction with FIG. 4, the intensity of the light propagated by the waveguide is only a minimal value at radius $r_2$ and can be made substantially zero within the exterior structural portion formed from tube 42, the material of tube 42 need not be of the high purity required of the light propagating core 50 or cladding layer 52. The material of tube 42 may be normally produced glass having an ordinary or even excessive level of impurities or entrapped bubbles that would render it unsuitable for effective light propagation; however, it must have a viscosity and coefficient of expansion compatible with the waveguide cladding and core materials. Since some portion of the optical signal propagates in cladding layer 54, it is preferred that tube 42 be made of material having a purity which equals that of composite structure 34. Thus, the preferred method of producing tube 42 is to deposit on a mandrel a soot coating by the flame hydrolysis process illustrated in FIG. 1. The composition of this soot is preferably the same as that employed to produce coating 22 of FIG. 2. As described in connection with the formation of composite structure 34, this soot coating is consolidated to form a dense glass layer, and the mandrel is thereafter removed to form the hollow tube 42. Although it is preferred that cladding layers 52 and 54 be formed from the same materials, they could be formed from different materials having similar refractive indices or from materials having slightly different refractive indices, the material having the lower refractive index preferably forming the outer cladding layer 54.

Tube 42 could also be produced by core drilling a solid glass rod, the rough surfaces left by drilling being smoothed by one or more methods such, for example, as laser milling, mechanical polishing, fire polishing, acid etching, or the like. A particularly suitable method for smoothing the inside wall of tube 10 comprises first mechanically polishing the rough surface and thereafter flame polishing the mechanically polished surface. Hydrofluoric acid washing of the surface before and after all polishing operations is desirable to avoid contamination.

A specific example of an optical waveguide produced in accordance with the present invention is as follows. A fused quartz tube mandrel, approximately 5 mm in diameter and 25 cm long is sealed to a suitable handle. Liquid $SiCl_4$ is maintained at 33°C in a first container, and liquid $GeCl_4$ is maintained at 43°C in a second container. Nitrogen carrier gas is bubbled through the first container at 2.2 liters per minute and through the second container at 0.5 liters per minute. The resultant vapors entrained within the nitrogen carrier gas are combined and passed through a gas-oxygen flame where the vapors hydrolyze to form a steady stream of particles having a composition of 10% by weight $GeO_2$ and 90% weight $SiO_2$. The stream of particles is directed to the mandrel and a soot layer of these particles is built up to a diameter of about 3.7 cm. A second coating of 100% $SiO_2$ is then applied over the first soot coating by terminating the flow of nitrogen to the liquid $GeCl_4$, thereby causing the introduction of only $SiCl_4$ vapor to the flame. This second stream of particles is continued until a diameter of about 6.1 cm is obtained. The resulting soot preform is placed in a muffle furnace having a hot zone of about 1,450°C to permit the soot particles to fuse and consolidate, thereby forming dense glass layers which are free from particle boundaries. The outside diameter of the outer dense glass layer is about 2.2 cm, and it is about 15 cm long. Concentrated HF is pumped through the hole in the quartz tube mandrel until the entire mandrel and a thin portion of the inner surface of the inner dense glass layer are removed, the resultant composite structure having an inside diameter of about 0.8 cm. The composite structure is then heated to about 1,800°C and drawn to form an intermediate fiber structure having an outside diameter of about 0.35 mm.

To form the outer cladding tube nitrogen carrier gas is bubbled through the first container and the resultant vapor is passed through a gas-oxygen flame where the vapors hydrolyze to form a stream of 100% SiO$_2$ soot particles. The stream of particles is directed to a 5 mm diameter, 25 cm long quartz mandrel tube until a 6.1 cm diameter soot coating is obtained. This soot coating is then consolidated in a furnace having a maximum temperature of about 1,500°C to form on the quartz tube a 15 cm long dense glass layer free from particle boundaries. Concentrated HF is pumped through the mandrel until it is completely removed, and a central hole having a diameter of about 0.8 cm is obtained, the outside tube diameter being about 2.2 cm. A portion about 15 cm long is cut from the partially drawn intermediate fiber of FIG. 5 and is inserted into hole 44 which extends axially through tube 42. The final composite structure so formed is heated to a temperature of about 1,900°C and is drawn to reduce the cross-sectional area thereof, to collapse the first applied layer and to collapse the inner surface of the tube into fused relation with the outer surface of the intermediate fiber structure, thereby forming an optical waveguide fiber having a solid cross-section. The resultant fiber has a core diameter of approximately 3 micrometers and an overall diameter of about 100 micrometers. This fiber is capable of single mode propagation at wavelengths as low as 633 nanometers.

I claim:

1. A method of forming a clad optical waveguide fiber comprising the steps of
   providing a substantially cylindrical mandrel,
   applying a first layer of glass to the outside peripheral surface of said mandrel,
   applying a second layer of glass having an index of refraction less than that of the glass of said first layer over the outside peripheral surface of said first layer,
   removing said mandrel,
   heating the structure so formed to the drawing temperature of the materials thereof,
   drawing the heated structure to reduce the cross-sectional area thereof, thereby forming an intermediate fiber,
   providing a glass tube having a hole extending axially therethrough,
   disposing at least a portion of said intermediate fiber within said tube,
   heating the final composite structure so formed to the drawing temperature thereof, and
   drawing said final composite structure to reduce the cross-sectional area thereof and to form an optical waveguide fiber having a solid cross-section, said first layer forming the core and said second layer and said tube forming the cladding of said optical waveguide fiber.

2. A method in accordance with claim 1 wherein said first coating of glass is formed by the steps comprising
   depositing a coating of glass soot on the outside peripheral surface of said mandrel by flame hydrolysis, and
   heating said soot until it consolidates and forms a dense glass layer free from particle boundaries.

3. A method in accordance with claim 2 wherein said coating of glass soot is at least 5 mm thick.

4. A method in accordance with claim 2 wherein said mandrel is removed before said second layer is applied.

5. A method in accordance with claim 2 wherein said second layer of glass is formed by the steps comprising
   depositing a second coating of glass soot over the outside peripheral surface of said first layer of glass by flame hydrolysis, and
   heating said first layer and said second coating of glass soot until said second layer of soot consolidates and forms a dense glass layer free from particle boundaries.

6. A method in accordance with claim 1 wherein said mandrel is a hollow tube of material selected from the group consisting of glass, ceramic and glass ceramic, and said step of removing said mandrel comprises flowing acid through said tube until said tube is completely removed by etching.

7. A method in accordance with claim 1 wherein said first and second layers of glass are formed by the steps comprising
   depositing a first coating of glass soot on the outside peripheral surface of said mandrel by flame hydrolysis,
   depositing a second coating of soot over the outside peripheral surface of said first coating by flame hydrolysis, and
   heating the resultant assembly until each coating of glass soot consolidates and forms a dense glass layer free from particle boundaries, said first consolidated coating of soot forming said first layer of glass and said second consolidated layer of soot forming said second layer of glass.

8. A method in accordance with claim 7 wherein the step of providing a glass tube comprises
   depositing a coating of glass soot on the outside peripheral surface of a mandrel by flame hydrolysis,
   heating said soot until it consolidates and forms a dense glass layer, and
   removing said mandrel.

9. A method in accordance with claim 1 wherein the refractive index of said tube is equal to the refractive index of said second layer of glass.

10. A method in accordance with claim 1 wherein the refractive index of said tube is less than the refractive index of said second layer of glass.

11. A method of forming a clad optical waveguide fiber for propagating a single mode of optical wave energy of wavelength λ comprising the steps of
    providing a substantially cylindrical mandrel,
    applying a first layer of glass of refractive index $n_1$ to the outside peripheral surface of said mandrel,
    applying a second layer of glass having a refractive index $n_2$ over the outside peripheral surface of said first layer, $n_1$ being greater than $n_2$,
    removing said mandrel,
    heating the structure so formed to the drawing temperature of the materials thereof,
    drawing the heated structure to reduce the cross-sectional area thereof, thereby forming an intermediate fiber,
    providing a glass tube having a hole extending axially therethrough,
    disposing at least a portion of said intermediate fiber within said tube,
    heating the final composite structure so formed to the drawing temperature thereof, and
    drawing said final composite structure to reduce the cross-sectional area thereof and to form an optical waveguide fiber having a solid cross-section, said first layer forming a core of radius $a$, wherein $a$ is determined by the equation $$(2\pi a/\lambda)(n_1+n_2)(n_1-n_2) < 2.405$$

and said second layer and said tube forming the cladding of said optical waveguide fiber.

12. A method in accordance with claim 11 wherein said first and second coatings of glass are formed by the steps comprising depositing a first coating of glass soot on the outside peripheral surface of said mandrel by flame hydrolysis, heating said soot until it consolidates and forms a first dense glass layer free from particle boundaries, depositing a second coating of glass soot over the outside peripheral surface of said first layer of glass by flame hydrolysis, and heating said first layer and said second coating of glass soot until said second coating of soot consolidates and forms a second dense glass layer free from particle boundaries.

13. A method in accordance with claim 12 wherein said first coating of glass soot is at least 5 mm thick.

14. A method in accordance with claim 11 wherein said first and second layers of glass are formed by the steps comprising depositing a first coating of glass soot on the outside peripheral surface of said mandrel by flame hydrolysis, depositing a second coating of soot over the outside peripheral surface of said first coating by flame hydrolysis, and heating the resultant assembly until each coating of glass soot consolidates and forms a dense glass layer free from particle boundaries, said first consolidated coating of soot forming said first layer of glass and said second consolidated layer of soot forming said second layer of glass.

15. A method in accordance with claim 14 wherein said first coating of glass soot is at least 5 mm thick.

* * * * *